(12) United States Patent
Zhang et al.

(10) Patent No.: US 12,508,710 B2
(45) Date of Patent: Dec. 30, 2025

(54) METHOD AND SYSTEM FOR COOPERATING PACKING ACTIONS AND UNPACKING ACTIONS OF MECHANICAL ARM BASED ON DEEP REINFORCEMENT LEARNING

(71) Applicant: SHANDONG UNIVERSITY, Jinan (CN)

(72) Inventors: Wei Zhang, Jinan (CN); Ran Song, Jinan (CN); Shuai Song, Jinan (CN); Shuo Yang, Jinan (CN); Shilei Chu, Jinan (CN); Yibin Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/998,175

(22) PCT Filed: Oct. 18, 2022

(86) PCT No.: PCT/CN2022/125985
§ 371 (c)(1),
(2) Date: Jan. 24, 2025

(87) PCT Pub. No.: WO2024/031831
PCT Pub. Date: Feb. 15, 2024

(65) Prior Publication Data
US 2025/0262765 A1 Aug. 21, 2025

(30) Foreign Application Priority Data
Aug. 9, 2022 (CN) .......................... 202210949670.2

(51) Int. Cl.
*B25J 9/16* (2006.01)
*B65G 57/03* (2006.01)
(Continued)

(52) U.S. Cl.
CPC .......... *B25J 9/1669* (2013.01); *B25J 9/1658* (2013.01); *B25J 9/1661* (2013.01); *B65G 57/03* (2013.01); *G05B 13/027* (2013.01)

(58) Field of Classification Search
CPC ...... B25J 9/1669; B25J 9/1658; B25J 9/1661; B25J 9/1679; B25J 18/00; B65G 57/03; G05B 13/027
See application file for complete search history.

(56) References Cited

U.S. PATENT DOCUMENTS

2020/0061811 A1* 2/2020 Iqbal ................... G06N 3/08
2021/0107137 A1* 4/2021 Ohige .................. B25J 9/1669
(Continued)

FOREIGN PATENT DOCUMENTS

CN 111331607 A 6/2020
CN 113592855 A 11/2021
(Continued)

*Primary Examiner* — Garcia Ade
(74) *Attorney, Agent, or Firm* — IPro, PLLC; Na Xu (57) ABSTRACT

A method for cooperating packing actions and unpacking actions of mechanical arm based on deep reinforcement learning (DRL), wherein a synergistic effect between a packing action and an unpacking action is learnt by means of a packing-unpacking network (PUN), thereby improving the packing precision and efficiency; and a packing heuristic algorithm and an unpacking heuristic algorithm are provided on the basis of human experience and are combined with the PUN, thereby further improving the packing precision and efficiency. Also provided are a system for cooperating packing actions and unpacking actions of mechanical arm based on DRL, a computer-readable storage medium, and an electronic device.

9 Claims, 7 Drawing Sheets

(51) Int. Cl.
　　　*G05B 13/02*　　　(2006.01)
　　　*G05B 15/00*　　　(2006.01)

(56) References Cited

U.S. PATENT DOCUMENTS

2023/0219744  A1*　7/2023　Shinagawa ............ B65D 85/68
　　　　　　　　　　　　　　　　　　　　　206/527
2024/0158183  A1*　5/2024　Chavez ................ B65G 47/905

FOREIGN PATENT DOCUMENTS

| CN | 113664825 A | 11/2021 |
| CN | 114800512 A | 7/2022 |

* cited by examiner

METHOD AND SYSTEM FOR COOPERATING PACKING ACTIONS AND UNPACKING ACTIONS OF MECHANICAL ARM BASED ON DEEP REINFORCEMENT LEARNING

This application claims priority benefits to Chinese Patent application no. 202210949670.2, entitled "A Method and System for Cooperating Packing Actions and Unpacking Actions of Mechanical Arm Based on Deep Reinforcement Learning", filed on Aug. 9, 2022, with the China National Intellectual Property Administration (CNIPA). The entire contents of which are incorporated herein by reference.

TECHNICAL FIELD

The invention relates to the technical field of logistics automation, in particular to a method and system for cooperating packing actions and unpacking actions of mechanical arm based on deep reinforcement learning.

BACKGROUND

The statements in this section merely provide background information related to the present invention and are not necessarily prior art.

With the rapid development of electronic commerce and express delivery industry, the establishment of an intelligent warehousing logistics system has become a new research hotspot. In a typical logistics packing scenario, the packer selects items one by one from the conveyor belt and then packs them into different product bins to establish product orders, while making full use of the space in each product bin and minimizing the volume waste in the product bin. In order to solve this task, most researchers formulate it as an on-line three-dimensional bin packing problem (3D-BPP) and propose many packing algorithms. This problem is designed to fit a group of items into as few 3D product bins as possible, while only observing the current items to be packed. As a classic NP-hard (non-deterministic polynomial-hard) combinatorial optimization problem, the 3D-BPP is not easy to find an optimal packing strategy when information only of one item may be obtained at a time.

Early solution mainly adopts a heuristic packing algorithm essentially modeling packing experience of human workers as rules as the packing strategy, which is an intuitive way to solve the packing task and usually maintains good working efficiency; however, the modeled rules of experience are not universal, without learning, the heuristic algorithms are unlikely to find the optimal packing strategy in various scenarios. Inspired by recent advances in deep reinforcement learning (DRL), researchers have attempted to solve the BPP through the DRL. The researchers define the BPP as a Markov decision process that learns the optimal packing strategy by obtaining rewards by constantly interacting with the environment for trial-and-error. Compared with traditional heuristic algorithms, the packing algorithm based on DRL may learn a more optimal packing strategy having a better robustness and generalization.

Although existing packing algorithms have made some good progress, those algorithms focus only on how to better place the currently observed item, ignoring a crucial human experience of unpacking. The so-called unpacking is to vacate more space for a current item by removing some inappropriate items in a product bin when there is no suitable room to place the current item in the product bin. In the situation of only one item can be observed at a time, this unpacking experience is very important for the BPP.

The existing algorithms for solving the 3D-BPP are mainly divided into two categories: heuristic algorithms and algorithms based on DRL.

The heuristic algorithms focus on packing a set of cubic items into a finite 3D space (such as a shipping product bin) with the highest possible space utilization, which is a typical NP-hard combinatorial optimization problem. The online 3D-BPP assumes that only the information of the item to be packed is available, while the information of other items is unknown. Early work mainly focuses on designing different heuristic algorithms, such as tabu search (TS) algorithm, first fit (FF) algorithm and extreme point (EP) algorithm, and the heuristic algorithms are essentially refinements of real packing experience of human workers, which are not perfect for different packing scenarios.

The DRL-based algorithms have been shown to be effective in solving combinatorial optimization problems. Some researchers have begun to try to use DRL to solve the 3D-BPP. For example, Verma et al. developed a DRL algorithm to solve the 3D-BPP for product bins with different size and number; Zhao et al. expressed the 3D-BPP as a constrained Markov decision process, and proposed a DRL framework with constraints to solve the BPP and demonstrated advanced packing performance in simulation environments; and, Yang et al. also tried to combine heuristic algorithms with the DRL to learn more optimal packing strategies.

However, compared with real human workers, existing algorithms still have many defects. This is because the human worker may take out some items from a product bin (unpacking) if there is no suitable room to place a current item in this product bin, thus freeing up more rooms to place the current item, which is impossible for existing artificial intelligence algorithms.

SUMMARY

To solve the defects of the prior art, the invention provides a method and system for cooperating packing actions and unpacking actions of mechanical arm based on DRL, improving the precision and efficiency of the packing by learning the cooperation between packing actions and unpacking actions through a packing-unpacking network (PUN); further improving the precision and efficiency of the packing through proposing a packing heuristic algorithm and an unpacking heuristic algorithm based on human experience and combining them into the PUN.

In order to achieve the above item, the present invention adopts the following technical solutions.

A first aspect of the present invention provides a method for cooperating packing actions and unpacking actions of mechanical arm based on DRL.

The method for cooperating packing actions and unpacking actions of the mechanical arm based on DRL, comprising the following processes:
  collecting a height diagram of a product bin and a mapping diagram of size of an item;
  extracting features from the height diagram of the product bin and the mapping diagram of size of the item;
  according to the extracted features, obtaining a probability distribution of a packing action performing at all positions on the height diagram based on a packing actor network, and obtaining a probability distribution of an unpacking action performing at the all positions on the height diagram based on a unpacking actor network;

according to the extracted features, obtaining packing prediction state values based on a packing review network, and obtaining unpacking prediction state values based on a unpacking review network;

according to the height diagram of the product bin and the mapping diagram of size of the item, obtaining, by a packing mask predictor, a packing mask based on a heuristic rule, and obtaining, by an unpacking mask predictor, a unpacking mask based on the heuristic rule; and modulating the probability distribution of the packing action by the packing mask to obtain a packing position, modulating the probability distribution of the unpacking action by the unpacking mask to obtain an unpacking position, and performing the packing action or the unpacking action by taking a maximum value of the packing prediction state values and a maximum value of the unpacking prediction state values as a final action type.

As an alternative implementation mode, for a product bin of size L×W×H, discretizing a state observation of the product bin at time t into the height diagram $H_t \in Z^{+L \times W}$, $Z^+ \in [0,H]$, wherein the height diagram is a discrete grid of L×W, and a value of each cell of the grid represents an accumulated height of items placed at the cell (position).

As an alternative implementation mode, an item to be packed n with a size of $l_n \times w_n \times h_n$ is characterized as a three-channel mapping diagram of size of L×W×3, and the three channels of the mapping diagram of size are assigned values of $l_n$, $w_n$, $h_n$, respectively.

As an alternative implementation mode, each of the packing action and the unpacking action is parameterized as a base action performed at a position p corresponding to one the cell in representation of the height diagram of the product bin.

Further, the packing action, comprising: placing an item on a cell, coordinates of a front left corner of a placement position of the item correspond to coordinates of the cell, and using a two-dimensional (2D) coordinate $(x_n, y_n)$ to represent position coordinates of the cell, and using an action (packing, $(x_n, y_n)$) indicates that the item n is placed at the position $(x_n, y_n)$ of the height diagram.

Further, the unpacking action, comprising: removing an item from a cell, the item is located in the product bin and the coordinates of the front left corner of the item are the same as the coordinates of the cell, setting a temporary item buffer to store up to B items removed by the unpacking, and an action (unpacking, $(x_m, y_m)$) indicates that the item n is removed from the position $(x_m, y_m)$ of the height diagram and placing the item n in the temporary item buffer.

As an alternative implementation mode, obtaining a predicted basic action to perform and position for an item to be packed at a time step t, wherein the item to be packed comes from a conveyor belt or the temporary item buffer:

if the packing action is predicted, grabbing the item to be packed from the conveyor belt or the temporary item buffer and placing the item to be packed at a target position p in the product bin, and then entering a time step t+1 to select a next item to be packed;

if the unpacking action is predicted, sucking the item m up from the target position p in the product bin and placing the item m in the temporary item buffer for temporary storage, and in the next time step t+1, continuing to predict the packing action or unpacking action by using the item n as a current item to be packed, until the item n is placed in the product bin; and after the item n is placed, using the item m in the temporary item buffer as the item to be packed to predict an action at the next time step; if there are multiple items in the temporary item buffer, selecting the item to be packed according to an order in which the multiple items are moved into the temporary item buffer by the unpacking; and, only after all items in the temporary item buffer are cleared, the next item to be packed may be selected from the conveyor belt.

As an alternative implementation mode, for the packing actor network and the unpacking actor network, an action constraint is treated as a re-normalized probability distribution $\pi_p(a_t, s_t)$, which is:

$$\pi_p(a_t, s_t) = \text{softmax}(f_{cons}(l_i)) = \begin{cases} \dfrac{\exp(l_i)}{\sum_j^N \exp(l_j)}, & M_i = \text{True} \\ 0, & M_i = \text{False} \end{cases}$$

where, N is the number of valid actions, $$f_{cons}(l_i) = \begin{cases} l_i, & M_i = \text{True} \\ -1 \times 10^{-8}, & M_i = \text{False} \end{cases},$$

$s_t$ is an environmental state at time t, $a_t$ is the action at time t, and $l_i$ is a non-normalized score of output of the packing actor network or the unpacking actor network.

As an alternative implementation mode, a reward function for the packing task is:

$$R_r(s_t, a, s_{t+1}) = r_v - \alpha \times r_w,$$

where, $r_v$ is a volume utilization rate, $r_w$ is a space waste rate, wherein the volume utilization rate $r_v$ is a ratio of volumes of all the items in the product bin to a total volume of the product bin, the space waste rate $r_w$ is a ratio of a wasted space in the product bin to the total volume of the product bin.

In a second aspect, the present invention provides a system for cooperating packing actions and unpacking actions of mechanical arm based on DRL.

The system for cooperating packing actions and unpacking actions of mechanical arm based on DRL, comprising:

a data acquisition module, configured to: collect a height diagram of a product bin and a mapping diagram of size of an item;

a feature extraction module, configured to: extract features from the height diagram of the product bin and the mapping diagram of size of the item;

a probability distribution generation module, configured to: according to the extracted features, obtain a probability distribution of a packing action performing at all positions on the height diagram based on a packing actor network, and obtain a probability distribution of an unpacking action performing at the all positions on the height diagram based on a unpacking actor network;

a state value generation module, configured to: according to the extracted features, obtain packing prediction state values based on a packing review network, and obtain unpacking prediction state values based on a unpacking review network;

a mask generation module, configured to: according to the height diagram of the product bin and the mapping diagram of size of the item, obtain a packing mask by a packing mask predictor based on a heuristic rule, and obtain a unpacking mask by an unpacking mask predictor based on the heuristic rule; and an action cooperation module, configured to: modulate the probability distribution of the packing action by the packing mask to obtain a packing position, modulate the probability distribution of the unpacking action by the unpacking mask to obtain an unpacking position, and perform the packing action or the unpacking action by taking a maximum value of the packing prediction state values and a maximum value of the unpacking prediction state values as a final action type.

A third aspect of the present invention provides a computer-readable storage medium having a program stored thereon, when the program is executed by a processor, implementing the steps of a method for cooperating packing actions and unpacking actions of mechanical arm based on DRL according to the first aspect of the present invention.

A fourth aspect of the present invention provides an electronic device, comprising a memory, a processor, and a program stored in the memory and executable on the processor, wherein when the processor executes the program, implementing the steps of a method for cooperating packing actions and unpacking actions of mechanical arm based on DRL according to the first aspect of the present invention.

Compared with the prior art, the present invention has the advantages that:

1. According to the present invention, the unpacking mechanism has been introduced into the BPP, through removing improperly placed items from a product bin and placing them in the product bin again, a final space utilization rate of the product bin has been greatly improved.

2. According to the present invention, a packing-unpacking network (PUN) based on DRL has been proposed, wherein The PUN is of a two-branch architecture and used to respectively generate state values corresponding to packing and unpacking actions and performing positions of each the action. The PUN determines whether to execute the packing action or the unpacking action according to the state values, and the whole cooperating process of packing and unpacking actions is learned under one DRL framework, which improves the accuracy and efficiency of cooperation control.

3. According to the present invention, a packing heuristic algorithm and an unpacking heuristic algorithm are designed and combined into the DRL framework to guide the learning of the network, further improving the accuracy and efficiency of cooperation control.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

The present invention will now be further described with reference to the accompanying drawings and examples.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

The embodiments and the features of the embodiments in the present invention may be combined with each other without conflict.

Embodiment 1

The present embodiment provides a method for cooperating packing actions and unpacking actions of mechanical arm based on DRL, comprising the following processes.

Figure 1:
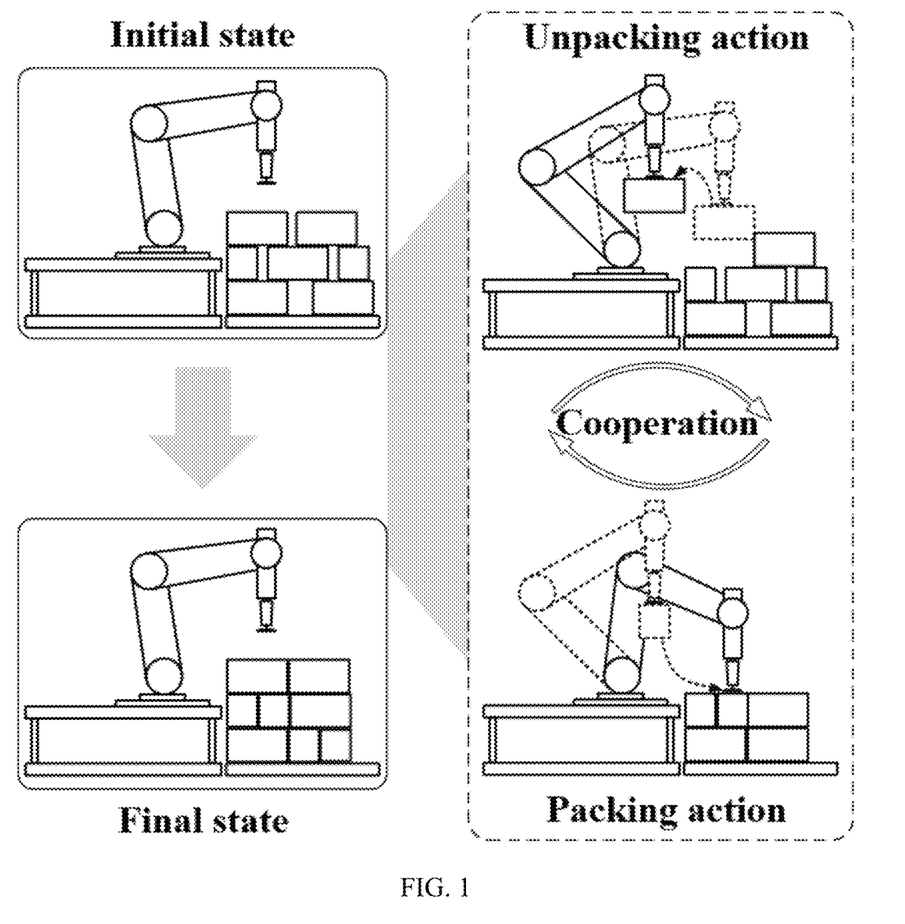
FIG. 1 is a schematic diagram of cooperation between a packing action and an unpacking action according to Embodiment 1 of the present invention.

An unpacking mechanism is introduced into the BPP, as shown in FIG. 1, to improve a final space utilization rate by removing improperly placed items out and placing them back in the product bin again. To learn the cooperation of packing and unpacking, the present embodiment proposes a packing-unpacking network based on DRL, which is named as PUN. Specifically, the PUN is of a two-branch architecture, which respectively generates state values corresponding to the packing and unpacking actions and the performing position of each action. The PUN determines whether to execute the packing action or the unpacking action according to the state value and the whole cooperation process of the packing and unpacking actions is learned under a DRL framework. Meanwhile, the present embodiment also designs the packing heuristic algorithm and the unpacking heuristic algorithm and combines them into the DRL framework to guide the learning of the network.

In an online 3D packing task, items are transported one by one to a target area by a conveyor belt, and then packed into a product bin. Only information of an item currently to be packed is observable, and this packing task may be formulated as a Markov Decision Process (MDP) subject to state S, action A, transition probability function P, and reward R. Using an end-to-end DRL framework to solve this MDP, wherein the framework seeks a strategy $\pi(a_t|s_t; \theta_\pi)$ to maximize a sum of cumulative expected rewards, which is expressed as:

$$J_{\pi_\theta} = \max_\theta E_{s,a \Box \pi_\theta} \left[ \sum_{t=1}^{T} \gamma^{t-1} r(s_t, a_t) \right].$$

S1: Packing-Unpacking Network (PUN)

Figure 2:
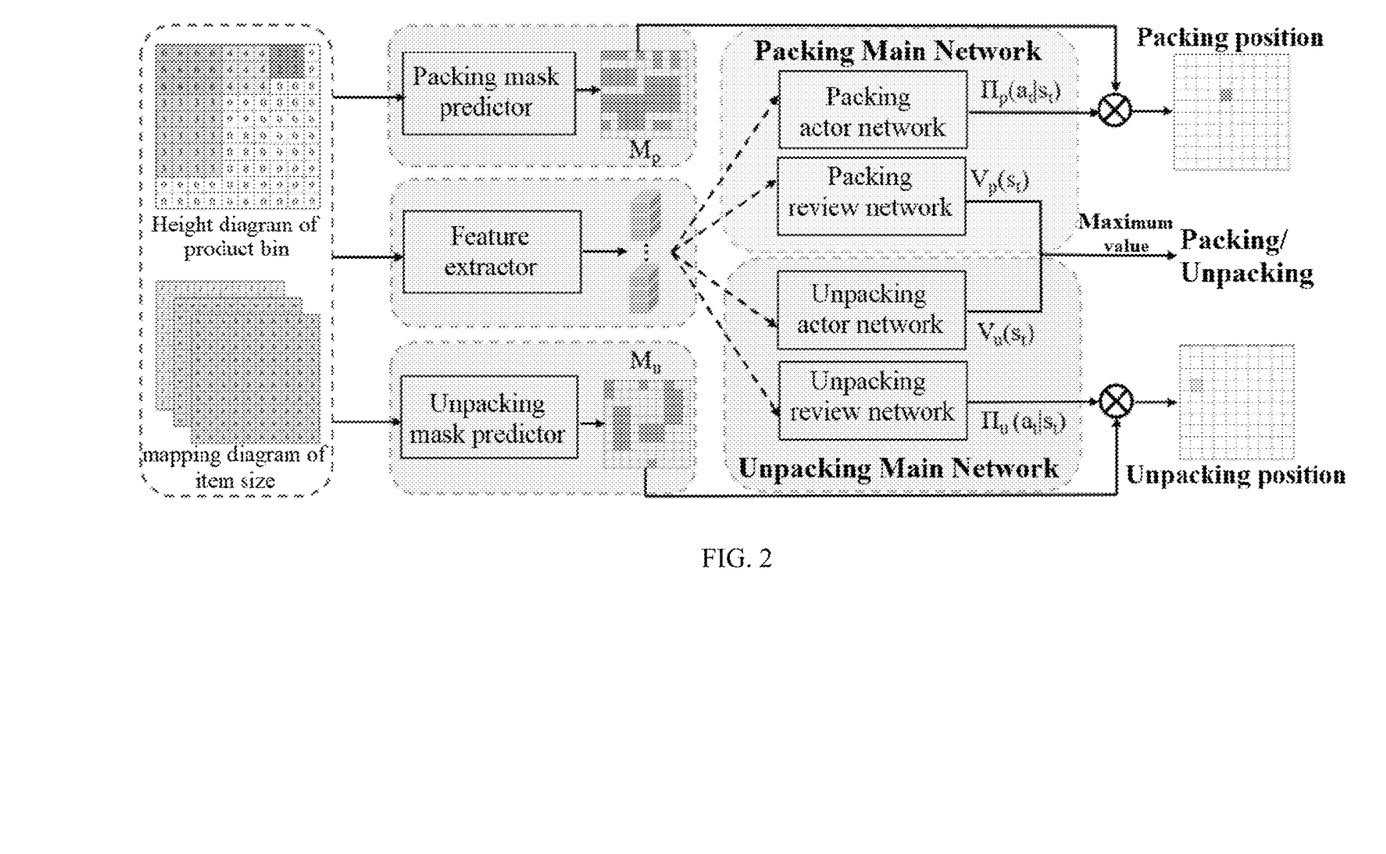
FIG. 2 is a structural diagram of a PUN network according to Embodiment 1 of the present invention.

A network structure of the PUN, as shown in FIG. 2, is described in detail as follows:

State characterization: modeling state observations of the product bin and the item to be packed to represent the state of the environment s: discretizing a state observation of the product bin with size L×W×H at a time t into a height diagram $H_t \in Z^{+L \times W}$, $Z^+ \in [0, H]$ as the state characterization of the product bin; wherein, the height diagram is a discrete grid of L×W, and a value of each cell of the discrete grid represents an accumulated height of items placed at the position of the cell; for an item to be packed n with a size of $l_n \times w_n \times h_n$, the state characterization thereof is a three-channel mapping diagram of size of L×W×3, and the three channels of the mapping diagram are assigned values of $l_n$, $w_n$, $h_n$, respectively.

Action definition: there are two types of actions have been defined: one type is packing action and the other one is unpacking action; wherein, each of the actions $a_t$ is parameterized as a basic action (i.e., a packing action or an unpacking action) performed at a position p corresponding to one cell c in the representation of the height diagram of the product bin:

$a_t = (\psi, p) | \psi \in \{packing, unpacking\}, p \rightarrow c \in H_t.$

Using coordinates of a front left bottom corner of the item as position coordinates of the item, wherein it requires that the coordinates of the front left corner of the item correspond to the given coordinates when performing the packing action or unpacking action on the item. The basic action $\Psi$ is defined as follows:

(1) Packing: placing an item on the cell c, wherein the coordinates of the front left corner of the item placement position correspond to the coordinates of the cell c: the present embodiment uses a 2D coordinates $(x_n, y_n)$ to represent the position coordinates of the cell c. An action (packing, $(x_n, y_n)$) represents placing the item n at the position $(x_n, y_n)$ of the height diagram.

(2) Unpacking: removing an item from the cell c, wherein the item is located in the product bin and the coordinates of the front left corner are the same as the coordinates of the cell c. In the present embodiment, a temporary item storage area is provided to store up to B items removed by the unpacking. An action (unpacking, $(x_m, y_m)$) indicates that the item n is removed from the position $(x_m, y_m)$ of the height diagram and placing the item n in the temporary item storage area.

Cooperating the packing action and the unpacking action, as shown in FIG. 2, using the PUN of a two-branch network structure, comprising using the height diagram of the product bin and the mapping diagram of size of the item as inputs, and outputting the type Y' of the basic action and the position of performance p on the height diagram. The states are input to a packing network and an unpacking network respectively after being encoded into features by a shared feature extraction module.

The two branches of the packing and the unpacking respectively consists of an actor network, a commentator network and a heuristic mask predictor. The actor networks and the commentator networks of the two branches respectively constitute a packing main network and an unpacking main network.

The two actor network outputs probability distributions of performing the basic actions $\Psi$ at all positions on the height diagram: the two commentator networks predict the state values $V_p(s_t)$ and $V_u(s_t)$, respectively, which are used to measure the cumulative rewards for taking the two basic actions in the state $s_t$; and, the two heuristic mask predictors generate a packing mask $M_p$ and an unpacking mask $M_u$ respectively based on heuristic rules to predict an effective packing position and an effective unpacking position; wherein, the probability distributions output by the actor networks are modulated by the heuristic mask.

For the current state $s_t$, the PUN outputs two state values $(V_p(s_t), V_u(s_t))$ and two probability distributions $(\pi_p(a_t, s_t), \pi_u(a_t, s_t))$ corresponding to the packing action and the unpacking action, and the final action $a_t$ consists of the base action $\Psi$ and the performing position p. Wherein, defining the action corresponding to a highest state value as the final basic action $\Psi$, which means that the DRL agent will theoretically get the highest reward for performing this action; and, the final performing position p will be sampled from the probability distribution corresponding to the final basic action.

Figure 3:
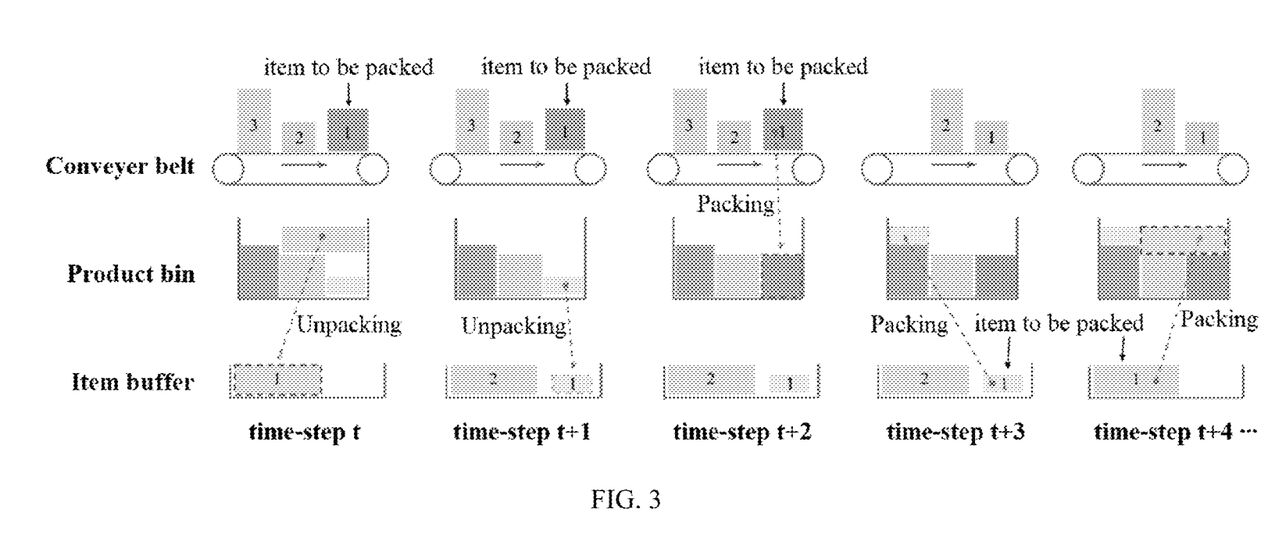
FIG. 3 is a schematic diagram of an example of the cooperation between the packing action and the unpacking action according to Embodiment 1 of the present invention.

The complete cooperation process of the packing and the unpacking is described as follows. For the item to be packed n at the time step t, the PUN predicts the basic action $\Psi$ and position p to be performed. The item n may come from the conveyor belt or the temporary item buffer. If the packing action is predicted, the agent will grab the item n from the conveyor belt (or the temporary item buffer) and place it at the target position p in the product bin, and then enter the time step t+1 to select the next item to be packed. If the unpacking action is predicted, the agent will suck the item m up from the target position p in the product bin and place it in the temporary item buffer for temporary storage. At the next time step t+1, the agent will continue to predict the packing or unpacking action using the item n as a current item to be packed until it is placed in the product bin. After placing the item n, the item m in the temporary item buffer is used as the item to be packed to predict another next time step. If there are multiple items in the temporary item buffer, the agent selects the item to be packed according to the order in which they were unpacked and removed into the temporary item buffer (first in, first out). Only after clearing all items in the temporary item buffer, the agent may select the next item to be packed from the conveyor belt. FIG. 3 shows an example of the cooperation process of the packing and the unpacking. The item to be packed in FIG. 3 represents the item waiting to be packed at the current time step, and the serial numbers on the items indicate the order of being packed.

Action constraint based on heuristic: there are three types of heuristic rules designed and introduced into the proposed network framework to guide the learning of the network.

The first one is physical heuristic, configured to define the actions that lead to the failure of packing and unpacking as invalid actions, such as the packing action that places items beyond boundaries of the product bin and the unpacking action that is performed at positions where no items are placed. The second one is packing heuristic, configured to consist of four popular heuristic packing algorithms, including extreme point placement algorithm, residual maximum space algorithm, first adaptation algorithm and hierarchical placement algorithm. The last one is unpacking heuristic, in the present embodiment, there are two unpacking rules are designed because of the few of the heuristic algorithms for unpacking at present, wherein for the items already placed in the product bin, the position of an item located at the top layer and whose volume is less than a certain threshold is defined as an effective unpacking position.

To incorporate these three heuristics into the DRL framework, there are two mask predictors designed to generate binary feasibility masks M that indicate valid and invalid actions: only actions that satisfy heuristic rules are valid. In the present embodiment, feasibility masks are then used to modulate the outputs of the packing and unpacking branches: in the DRL framework, the actor network outputs non-normalized logits l, which are then transformed into probability distributions of action by normalization operations at the Softmax layer, wherein for the invalid actions, replacing their corresponding logit with a very large negative value $-1 \times 10^{-8}$, so the probability of invalid actions output by the Softmax layer is almost zero. The action constraint is considered as a re-normalized probability distribution $\pi_p(a_t, s_t)$:

$$\pi_p(a_t, s_t) = \mathrm{softmax}(f_{cons}(l_i)) = \begin{cases} \dfrac{\exp(l_i)}{\sum_j^N \exp(l_j)}, & M_i = \mathrm{True} \\ 0, & M_i = \mathrm{False} \end{cases},$$

where N is the number of valid actions, and:

$$f_{cons}(l_i) = \begin{cases} l_i, & M_i = \mathrm{True} \\ -1 \times 10^{-8}, & M_i = \mathrm{False} \end{cases}.$$

Reward function: there is a step-by-step reward designed for the packing task, comprising two parts: volume utilization rate $r_v$ and space waste rate $r_w$; wherein, the volume utilization rate $r_v$ is defined as a ratio of volumes of all the items in the product bin to a total volume of the product bin:

$$r_v = \frac{\sum_i^I l_i \times w_i \times h_i}{L \times W \times H};$$

the space waste rate $r_w$ is defined as a ratio of a wasted space in the product bin to the total volume of the product bin, and is used to measure the size of the wasted space of items cannot be placed in the current state.

Figure 4:
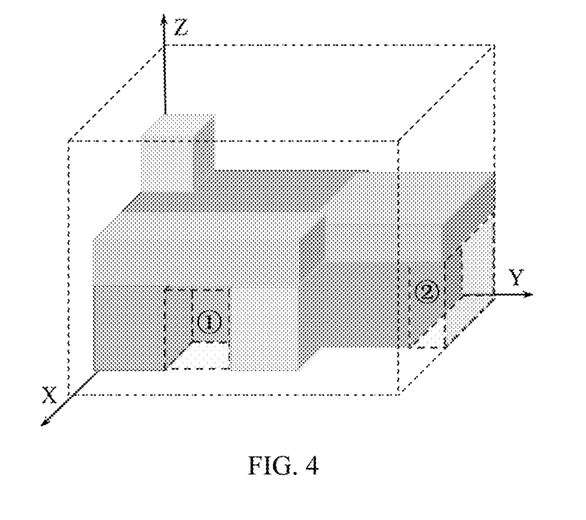
FIG. 4 is a schematic diagram of an example of space waste according to Embodiment 1 of the present invention.

As shown in FIG. 4, two dotted cuboids marked by serial numbers 1 and 2 are the wasted space in the current state. The reward described in the present embodiment is set to encourage the performance of the unpacking actions that reduce wasted space. The complete reward function is defined as:

$$R_r(s_t, a, s_{t+1}) = r_v - \alpha \times r_w,$$

where $\alpha$ is the weight parameter of space waste rate $r_w$.

S2: Real Logistics Scenario Deployment

To verify the packing performance of the proposed algorithm in real scenarios, the present embodiment establishes a real robot packing system to deploy the strategy learned in simulation.

Figure 5:
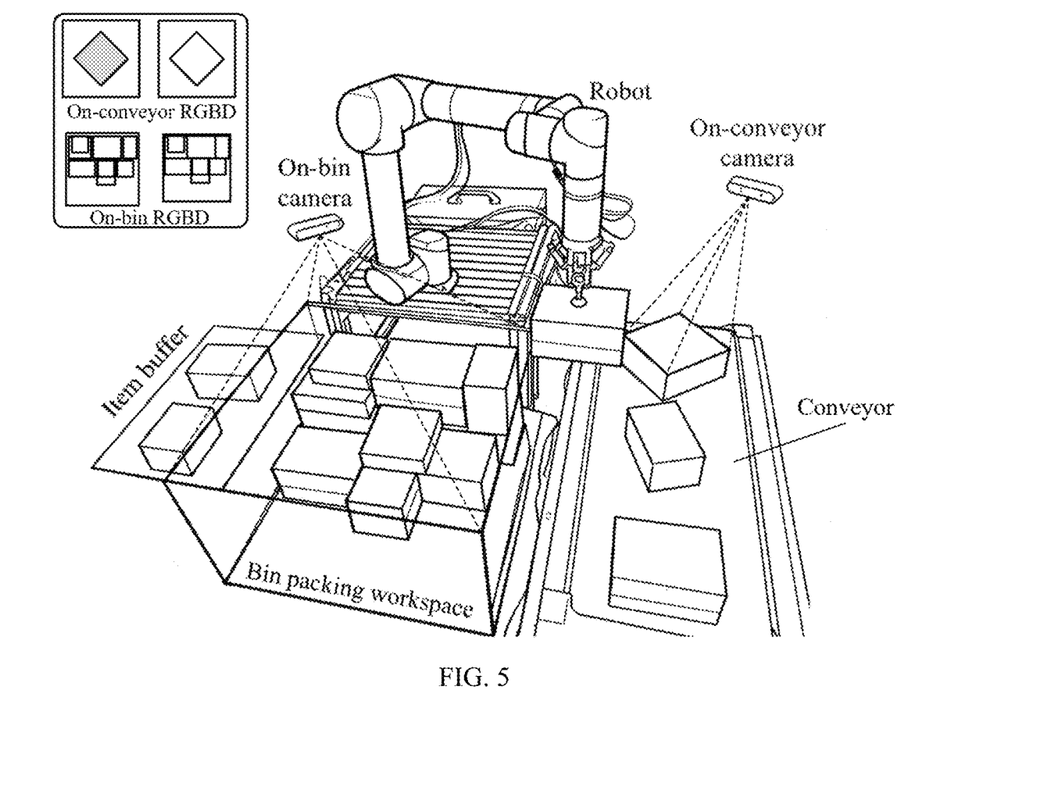
FIG. 5 is a schematic diagram of a robot packing system according to Embodiment 1 of the present invention.

FIG. 5 shows the robotic packing system. The system comprises three workspaces: a conveyor belt for transporting items, a product bin for storing items, and a buffer for temporarily storing items. The UR5 mechanical arm equipped with suction cup device is used to perform grabbing and placing tasks. Two Intel® RealSense™ D435i cameras are positioned above the conveyor belt and the product bin, respectively, to capture RGB-D image information for these two areas at pixel resolution of 1280×720.

Since the packing strategy is trained in a simulation environment, it needs a transfer strategy to apply it to the real environment, and the most important thing therein is to unify the input and output of the simulation and the real environment. There are two inputs to state characterization of the PUN: the height diagram of the product bin and the mapping diagram of size of the item. To obtain the height diagram of the product bin, in the present embodiment, the image captured by the camera will be filtered first, and then mapped to a discrete orthogonal grid using bilinear interpolation method, wherein the mapped grid has the same resolution (L×W) as the required height diagram. To obtain the mapping diagram of size of the item, in the present embodiment, boundary detection on the image of the item on the conveyor belt is performed using a background subtraction algorithm, then 3D size information of the item is calculated. In order to simplify the calculation and ensure the safety of the packing process, the 3D size of the item is converted into discrete values by rounding up, and finally assigned to a 3D map of L×W×3.

S3: Experimental Result

S3.1: Data Set Generation

To train and test the proposed network, in the present embodiment, creating three data sets of packing, which are DATA-1, DATA-2, and DATA-3, respectively. To generate DATA-1, first cutting a product bin of size Sa into items of different sizes along the length, width and height directions, wherein the size $s^d$ of each the item does not exceed $S^d/2$, and then randomly scrambling a sequence of the cut item to increase the diversity of the data. To generate DATA-2 and DATA-3, first predefining 64 items of different size, then cutting the product bin of size $S^d$ into multiple items of predefined size, and then sorting the sequence of the cut item according to the set rules. Statistic shows that DATA-2 and DATA-3 contain fewer items than DATA-1, and the average volume of the corresponding items is larger, which will affect the packing performance of the algorithm on these three datasets.

S2: Packing Performance Comparison Experiment

The proposed algorithm is compared with 10 baseline algorithms. The 10 baseline algorithms can be divided into two groups: the first group comprises one random packing strategy and six heuristic packing algorithms, and the second group comprises three most advanced DRL-based packing algorithms. For DRL-based algorithms, when there is not enough space for the current item in the product bin, the agent will stop the current round of packing and enter a new round. Since there are different variants of algorithms proposed by existing schemes, the present embodiment selects the one with the best performance as the baseline.

In the present embodiment, there are three indexes used to evaluate the packing performance, which are: a space utilization rate, defined as the ratio of the volume of all items in the product bin to the total volume of the product bin: a packing quantity, defined as the average number of items contained in the product bin; and a standard deviation, defined as a standard deviation of an index of the space utilization rate. The experimental results, as shown in Table 1, show that the algorithm of the present embodiment is superior to the baseline algorithm in all evaluation indexes. This shows that compared with other algorithms, the algorithm of the present embodiment can make full use of the space in the product bin and has higher robustness. Furthermore, due to the differences in size and number of items in the three datasets, the packing algorithm used outperforms DATA-2 and DATA-3 on DATA-1.

constraint removed from PUN, but still learns the cooperation of the packing and the unpacking through DRL.

Figure 7:
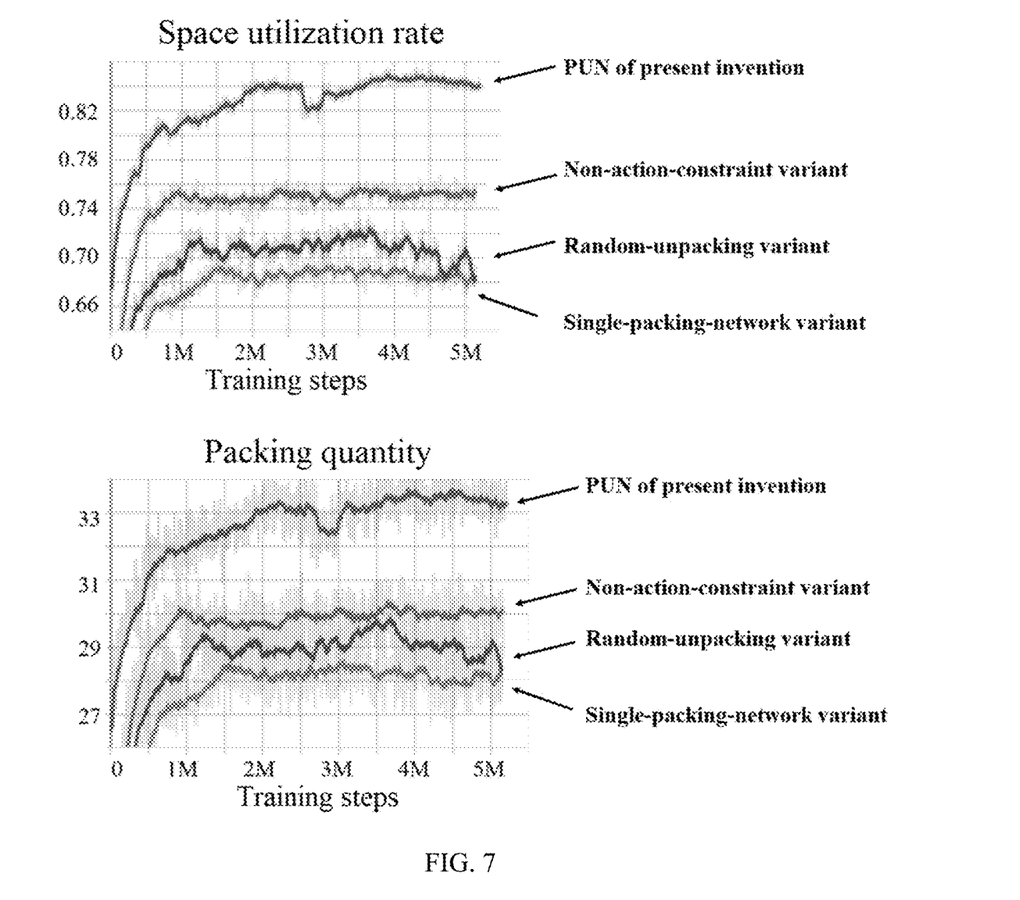
FIG. 7 is a learning curve of a PUN variant according to Example 1 of the present invention.

In the present embodiment, ablation experiments were performed on DATA-1 and learning curves were drawn, and the results are shown in FIG. 7. Firstly, PUN outperforms the other three variants in the space utilization rate and the packing quantity, which proves the effectiveness of the proposed network design. Secondly, the variants with unpacking action (PUN, non-action-constraint variant, random unpacking variant) have higher space utilization rate and number of packed items than the variants without unpacking action (single-packing network variant). This result shows that the addition of the unpacking action effectively improves the packing performance, thereby prov-

TABLE 1

Comparison of packing performance of different algorithms

|  |  | DATA-1 | | | DATA-2 | | | DATA-3 | | |
| --- | --- | --- | --- | --- | --- | --- | --- | --- | --- | --- |
|  | Arithmetic | Space utilization rate | Packing quantity | Standard deviation | Space utilization rate | Packing quantity | Standard deviation | Space utilization rate | Packing quantity | Standard deviation |
| Heuristic algorithm | Stochastic strategy algorithm | 0.363 | 15.66 | 0.131 | 0.348 | 9.61 | 0.134 | 0.366 | 10.16 | 0.12 |
|  | Column placement algorithm | 0.629 | 25.75 | 0.125 | 0.566 | 14.76 | 0.124 | 0.571 | 15.26 | 0.127 |
|  | Hierarchical placement algorithm | 0.634 | 25.91 | 0.127 | 0.557 | 14.52 | 0.139 | 0.568 | 15.17 | 0.036 |
|  | First adaptation algorithm | 0.611 | 24.92 | 0.129 | 0.571 | 14.94 | 0.132 | 0.572 | 15.23 | 0.136 |
|  | Corner placement algorithm | 0.662 | 26.76 | 0.121 | 0.654 | 17.05 | 0.139 | 0.641 | 17.10 | 0.124 |
|  | EP algorithm | 0.667 | 27.73 | 0.126 | 0.584 | 15.20 | 0.115 | 0.586 | 15.62 | 0.129 |
|  | Residual maximum space algorithm | 0.669 | 27.79 | 0.114 | 0.652 | 16.99 | 0.118 | 0.649 | 17.31 | 0.124 |
| Learning-based algorithm | DRL algorithm with constraints | 0.687 | 28.61 | 0.103 | 0.632 | 16.39 | 0.114 | 0.642 | 16.97 | 0.111 |
|  | Heuristic DRL algorithm | 0.704 | 29.13 | 0.097 | 0.667 | 17.31 | 0.104 | 0.675 | 18.05 | 0.105 |
|  | Packing configuration tree algorithm | 0.834 | 32.91 | 0.084 | 0.819 | 20.93 | 0.087 | 0.813 | 21.37 | 0.092 |
|  | PUN | 0.855 | 34.34 | 0.061 | 0.826 | 21.11 | 0.073 | 0.830 | 21.82 | 0.071 |

Figure 6:
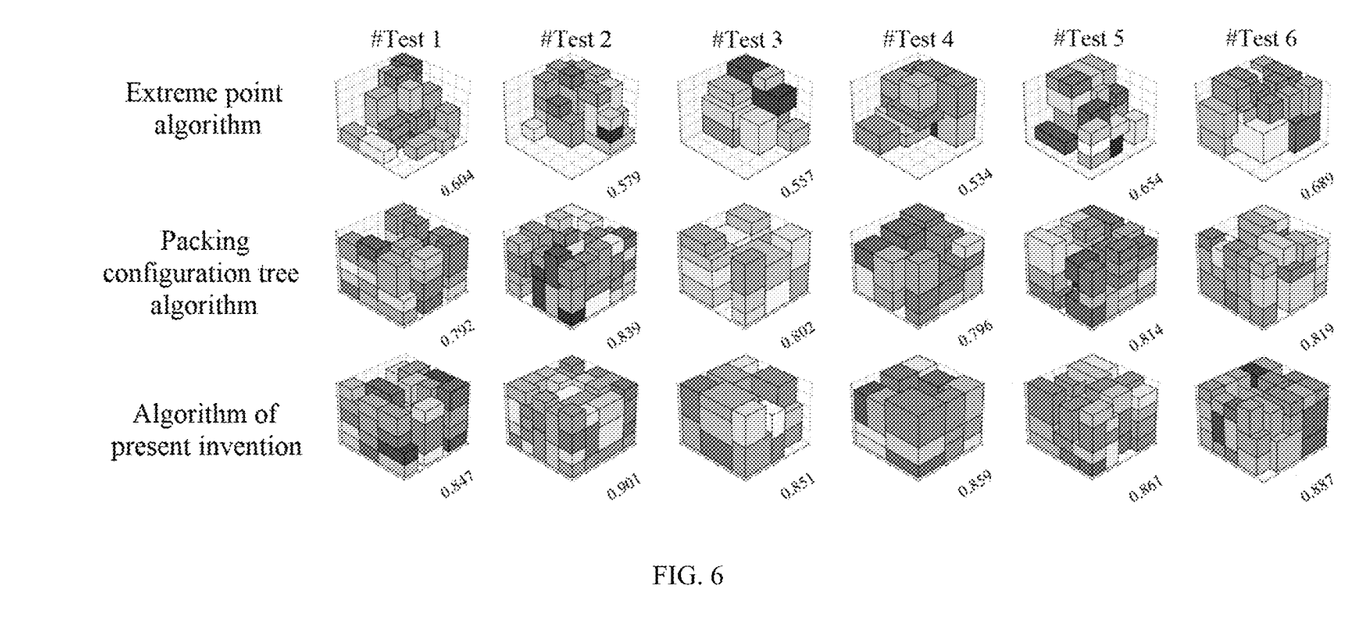
FIG. 6 is a visual effect diagram of different packing algorithms according to Embodiment 1 of the present invention.

The present embodiment also visualizes the packing results of the PUN and the two baseline algorithms to qualitatively compare their packing performance. In this qualitative experiment, six item sequences were randomly selected from the DATA-1, and all algorithms used the same item sequence for each test. The visualization results are shown in FIG. 6, where the values next to each sub-diagram represent the space utilization rate of the algorithm. The results show that the algorithm of the present embodiment achieves better packing performance and higher packing utilization.

S3.3 Ablation Experiments

To demonstrate the validity of the design and choice for the PUN, in the present embodiment, there are 3 variants created for its design and conducted a series of ablation studies. The first one is a single-packing network variant for which only the packing branches of the PUN are retained and retrained. The second one is a random unpacking variant, which adds the unpacking based on the packing branch, but the unpacking part is designed as an unpacking module based on random rules, and a specific rule thereof is that randomly selecting the item in the product bin for unpacking if there is not enough space in the product bin for placing the item. The third one is a non-action-constraint variant, which is a simplified version of the heuristic action ing the effectiveness of introducing the unpacking mechanism for the 3D packing task proposed in the present embodiment. Thirdly, for the three variants with unpacking action, the learning-based variant (PUN, non-action-constraint variant) performs better than the random-rule-based variant (random unpacking variant). This proves the validity of the DRL framework proposed by the present embodiment to learn the cooperation between the packing and the unpacking. Finally, the packing performance of the PUN is better than that of the non-action-constraint variant, which proves that the action constraint based on heuristic rules provides useful guidance for PUN training and improves the packing performance.

In order to explore the influence of different reward function settings on the packing effect, in the present embodiment, there are three reward functions additionally designed, and compared those with the reward functions used by the algorithm described in the present embodiment on DATA-1. The first one is a constant reward, comprising: at each time step of packing, a fixed value reward of 1 is obtained if the packing operation is successfully performed, and a fixed value reward of 0.5 is obtained if the unpacking action is successfully performed: a reward of 0 is obtained if the action is failed. The second one is a final utilization rate reward, comprising: for each packing process, recording and using the space utilization rate of packing of the last time step as a reward for each time step. The last one is a packing quantity reward, comprising: taking the number of items contained in the product bin at each time step as the reward for that time step. The experimental results are shown in Table 2. The reward function used in the present embodiment is superior to the other three reward settings in terms of the space utilization rate and the packing quantity, which proves the effectiveness of the proposed reward function.

TABLE 2

Comparison of different reward functions

| Reward function | Space utilization rate | Packing quantity | Standard deviation |
|---|---|---|---|
| Constant value reward | 0.742 | 29.96 | 0.085 |
| Final utilization rate reward | 0.745 | 30.07 | 0.091 |
| Packing quantity reward | 0.771 | 31.84 | 0.087 |
| Reward of algorithm of the present embodiment | 0.855 | 34.34 | 0.061 |

In the present embodiment, experiments are conducted on the upper limit of the number of items in the temporary item buffer on the DATA-1 to explore the influence of different capacities B of the buffer. For this experiment, the end condition of each packing process is that the number of items in the temporary item buffer exceeds the upper limit of the temporary item buffer, or there is no suitable place in the product bin for performing the unpacking or packing operation. The experimental results, shown in Table 3, indicate that larger size B of the temporary item buffer lead to higher packing performance. However, when the upper limit of the capacity exceeds 12, the performance improvement of the algorithm in the present embodiment is no longer significant.

TABLE 3

Comparison of capacity caps of different temporary item buffers

| | Temporary item buffer capacity | | | | | | | |
|---|---|---|---|---|---|---|---|---|
| | 2 | 4 | 6 | 8 | 10 | 12 | 14 | unlimited |
| Space utilization rate | 0.739 | 0.791 | 0.815 | 0.834 | 0.852 | 0.855 | 0.854 | 0.855 |
| Number of items | 29.21 | 30.74 | 32.57 | 33.19 | 34.21 | 34.32 | 34.31 | 34.34 |

S3.4: Real Scene Packing Demonstration

Figure 8:
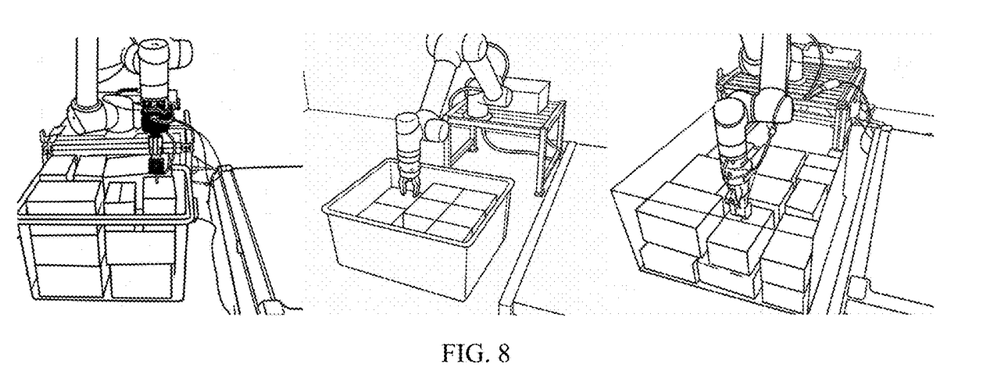
FIG. 8 is an effect diagram of demonstrating the packing under real scene according to Embodiment 1 of the present invention.

In the present embodiment, the proposed algorithm has been demonstrated in a real physical scenario, where the mechanical arm packs items from the conveyor belt into product bins using the learned cooperation between the packing and the unpacking. This part comprises three test experiments, wherein the first two experiments demonstrated the online packing process for two different types of items (e.g., delivery box, merchandise box). In the third experiment, in the present embodiment, a disturbance is added in the middle of the packing process of the mechanical arm, which is that artificially placing a number of items randomly, and then the mechanical arm continues to packing from this scene. FIG. 8 shows the test results of the algorithm of the present embodiment under these three experiments. It can be seen that different items are packed into product bin with high space utilization rate. The complete packing process has been recorded by video, which indicates that the algorithm of the present embodiment reliably completes the online 3D packing task under different real logistics scenarios.

According to the invention, an unpacking mechanism is introduced for the 3D-BPP, and on this basis, a packing-unpacking network (PUN) is proposed to learn the cooperation between the packing action and the unpacking action: a packing heuristic and an unpacking heuristic are also proposed based on human experience, and are combined into the PUN to further improve the packing performance; and on this basis, a real-world robot packing system is designed to deploy the learned strategy, and simulation and real experiment results prove the effectiveness of the method of the embodiment.

Embodiment 2

The present embodiment provides a system for cooperating packing actions and unpacking actions of mechanical arm based on DRL, comprising:
  a data acquisition module, configured to: collect a height diagram of a product bin and a mapping diagram of size of an item;
  a feature extraction module, configured to: extract features from the height diagram of the product bin and the mapping diagram of size of the item;
  a probability distribution generation module, configured to: according to the extracted features, obtain a probability distribution of a packing action performing at all positions on the height diagram based on a packing actor network, and obtain a probability distribution of an unpacking action performing at the all positions on the height diagram based on a unpacking actor network;
  a state value generation module, configured to: according to the extracted features, obtain packing prediction state values based on a packing review network, and obtain unpacking prediction state values based on a unpacking review network;
  a mask generation module, configured to: according to the height diagram of the product bin and the mapping diagram of size of the item, obtain a packing mask by a packing mask predictor based on a heuristic rule, and obtain a unpacking mask by an unpacking mask predictor based on the heuristic rule;
  an action cooperation module, configured to: modulate the probability distribution of the packing action by the packing mask to obtain a packing position, modulate the probability distribution of the unpacking action by the unpacking mask to obtain an unpacking position, and perform the packing action or the unpacking action by taking a maximum value of the packing prediction state values and a maximum value of the unpacking prediction state values as a final action type.

The operation of the system is the same as that of the method for cooperating packing actions and unpacking actions of the mechanical arm based on DRL provided in Embodiment 1, and is not repeated here.

Embodiment 3

The present embodiment provides a computer-readable storage medium having a program stored thereon; when the program is executed by a processor, implementing the steps of a method for cooperating packing actions and unpacking actions of mechanical arm based on DRL according to Embodiment 1 of the present invention.

Embodiment 4

The present embodiment provides an electronic device, comprising a memory, a processor, and a program stored in the memory and executable on the processor, wherein when the processor executes the program, implementing the steps of a method for cooperating packing actions and unpacking actions of mechanical arm based on DRL according to Embodiment 1 of the present invention.

Those skilled in the art should understand that the examples of the present invention can be provided as methods, systems, or computer program products. Therefore, the present invention may take the form of hardware examples, software examples, or examples combining software and hardware aspects. Furthermore, the present invention may take the form of a computer program product implemented on one or more computer usable storage media (including but not limited to disk memory, optical memory, etc.) containing computer usable program codes.

The present invention is described with reference to flowcharts and/or block diagrams of methods, devices (systems), and computer program products according to the examples of the present invention. It should be understood that each of the processes and/or boxes in the flowchart and/or block diagram, and the combination of the processes and/or boxes in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one process or multiple processes of the flowchart and/or one box or multiple boxes of the block diagram.

These computer program instructions may also be stored in a computer-readable memory capable of directing the computer or other programmable data processing apparatus to operate in a particular manner such that the instructions stored in such the computer-readable memory produce an article of manufacture comprising an instruction device that implements the function specified in one process or a plurality of processes of the flowchart and/or one box or a plurality of boxes of the block diagram.

These computer program instructions may also be loaded onto a computer or other programmable data processing device to enable a series of operational steps to be performed on the computer or other programmable device to generate a computer implemented process, so that instructions executed on a computer or other programmable device provide steps for implementing functions specified in one process or a plurality of processes of the flowchart and/or in one box or a plurality of boxes of the block diagram.

Those skilled in the art can understand that the realization of all or part of the processes in the methods of the above examples can be accomplished by instructing relevant hardware through a computer program. The program can be stored in a computer-readable storage medium. When the program is executed, it may comprise the processes of the examples of the above methods. The storage medium may be a disk, optical disc, Read-only memory (ROM) or random access memory (RAM).

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for a mechanical arm to execute packing actions and unpacking actions based on deep reinforcement learning (DRL), wherein the method is applied on a robotic packing system comprising three workspaces of a conveyor belt for transporting items, a product bin for storing items, and a temporary item buffer for temporarily storing items, the mechanical arm equipped with a suction cup device is provided in a middle of the three workspaces; and, the method comprises the following processes:

collecting, by cameras, a height diagram of the product bin and a mapping diagram of size of an item to be packed comes from the conveyor belt or the temporary item buffer;

extracting features from the height diagram of the product bin and the mapping diagram of size of the item to be packed;

according to the extracted features, obtaining a probability distribution of a packing action performing at all positions on the height diagram based on a packing actor network, and obtaining a probability distribution of an unpacking action performing at the all positions on the height diagram based on a unpacking actor network;

according to the extracted features, obtaining packing prediction state values based on a packing review network, and obtaining unpacking prediction state values based on a unpacking review network;

according to the height diagram of the product bin and the mapping diagram of size of the item to be packed, obtaining, by a packing mask predictor, a packing mask based on a heuristic rule, and obtaining, by an unpacking mask predictor, a unpacking mask based on the heuristic rule; and modulating the probability distribution of the packing action by the packing mask to obtain a packing position, modulating the probability distribution of the unpacking action by the unpacking mask to obtain an unpacking position, and taking a maximum value of the packing prediction state values and a maximum value of the unpacking prediction state values as an indicator of a final action type, to control the mechanical arm to:

if the packing action is indicated in a current time step "t", grab the item to be packed from the conveyor belt or the temporary item buffer and place the item to be packed at a target position "p" in the product bin, and then entering a next time step "t+1" to select a next item to be packed;

if the unpacking action is indicated in the current time step "t", suck an item "m" up from the target position "p" in the product bin and place the item "m" in the temporary item buffer for temporary storage, and in the next time step "t+1", place an item "n" as a current item to be packed in the product bin; and after the item "n" is placed, place the item "m" from the temporary item buffer into the product bin according to an indicated final action type at a following time step.

2. The method for the mechanical arm to execute packing actions and unpacking actions based on DRL according to claim 1, wherein:

for a product bin of size L×W×H, discretizing a state observation of the product bin at the current time step "t" into the height diagram $H_t \in Z^{+^{L \times W}}$, $Z^+ \in [0, H]$, wherein the height diagram is a discrete grid of L×W, and a value of each cell of the grid represents an accumulated height of items placed at the each cell; or, for the item to be packed "n" with a size of $l_n \times W_n \times h_n$, characterizing the item to be packed "n" as a three-channel mapping diagram of size of L×W×3, and the three channels of the mapping diagram of size are assigned values of $l_n$, $w_n$, and $h_n$, respectively.

3. The method for the mechanical arm to execute packing actions and unpacking actions based on DRL according to claim 1, wherein:

each of the packing action and the unpacking action is parameterized as a base action performed at the target position "p" corresponding to one the cell in representation of the height diagram of the product bin.

4. The method for the mechanical arm to execute packing actions and unpacking actions based on DRL according to claim 3, wherein:

the packing action, comprising: placing an item on a cell, coordinates of a front left corner of a placement position of the item correspond to coordinates of the cell, and using a two-dimensional (2D) coordinate $(x_n, y_n)$ to represent position coordinates of the cell, and using an action (packing, $(x_n, y_n)$) indicates that the item "n" is placed at the position $(x_n, y_n)$ of the height diagram; or, the unpacking action, comprising: removing an item from a cell, the item is located in the product bin and the coordinates of the front left corner of the item are the same as the coordinates of the cell, setting a temporary item buffer to store up to B items removed by the unpacking, and an action (unpacking, $(x_m, y_m)$) indicates that the item "n" is removed from the position $(x_m, y_m)$ of the height diagram and placing the item "n" in the temporary item storage area.

5. The method for the mechanical arm to execute packing actions and unpacking actions based on DRL according to claim 1, wherein:

if there are multiple items in the temporary item buffer, selecting the item to be packed according to an order in which the multiple items are moved into the temporary item buffer by the unpacking; and, only after all items in the temporary item buffer are cleared, the next item to be packed may be selected from the conveyor belt.

6. The method for the mechanical arm to execute packing actions and unpacking actions based on DRL according to claim 1, wherein:

for the packing actor network and the unpacking actor network, an action constraint is treated as a re-normalized probability distribution $\pi_p(a_t, s_t)$, which is:

$$\pi_p(a_t, s_t) = \mathrm{softmax}(f_{cons}(l_i)) = \begin{cases} \dfrac{\exp(l_i)}{\sum_j^N \exp(l_j)}, & M_i = \text{True} \\ 0, & M_i = \text{False} \end{cases},$$

where, N is the number of valid actions, $$f_{cons}(l_i) = \begin{cases} l_i, & M_i = \text{True} \\ -1 \times 10^{-8}, & M_i = \text{False} \end{cases},$$

$s_t$ is an environmental state at the current time step "t", $a_t$ is the action at the current time step "t", and $l_i$ is a non-normalized score of output of the packing actor network or the unpacking actor network.

7. The method for the mechanical arm to execute packing actions and unpacking actions based on DRL according to claim 1, wherein:

a reward function for the packing task is: $R_t(s_t, a, s_{t+1}) = r_v - \alpha \times r_w$, where, $\alpha$ is the weight parameter of a space waste rate $r_w$, $r_v$ is a volume utilization rate, $r_w$ is the space waste rate, wherein the volume utilization rate $r_v$ is a ratio of volumes of all the items in the product bin to a total volume of the product bin, the space waste rate $r_w$ is a ratio of a wasted space in the product bin to the total volume of the product bin.

8. A non-transitory computer-readable storage medium having a program stored thereon, when the program is executed by a processor, implementing the steps of a method for cooperating packing actions and unpacking actions of mechanical arm based on DRL according to claim 1.

9. An electronic device, comprising a memory, a processor, and a program stored in the memory and executable on the processor, wherein when the processor executes the program, implementing the steps of a method for cooperating packing actions and unpacking actions of mechanical arm based on DRL according to claim 1.

* * * * *